July 7, 1942.  R. KAREY  2,289,124
INTERNAL COMBUSTION ENGINE
Filed April 11, 1939     13 Sheets-Sheet 1

INVENTOR.
ROMUALD KAREY
BY F. Bascom Smith
ATTORNEY.

July 7, 1942.　　　　R. KAREY　　　　2,289,124
INTERNAL COMBUSTION ENGINE
Filed April 11, 1939　　　13 Sheets-Sheet 3

INVENTOR.
ROMUALD KAREY
BY F. Bascom Smith
ATTORNEY.

July 7, 1942.   R. KAREY   2,289,124
INTERNAL COMBUSTION ENGINE
Filed April 11, 1939   13 Sheets-Sheet 5

INVENTOR.
ROMUALD KAREY
BY F. Bascom Smith
ATTORNEY.

July 7, 1942. R. KAREY 2,289,124
INTERNAL COMBUSTION ENGINE
Filed April 11, 1939 13 Sheets-Sheet 7

INVENTOR.
ROMUALD KAREY
BY F. Bascom Smith
ATTORNEY.

July 7, 1942. R. KAREY 2,289,124
INTERNAL COMBUSTION ENGINE
Filed April 11, 1939 13 Sheets-Sheet 8
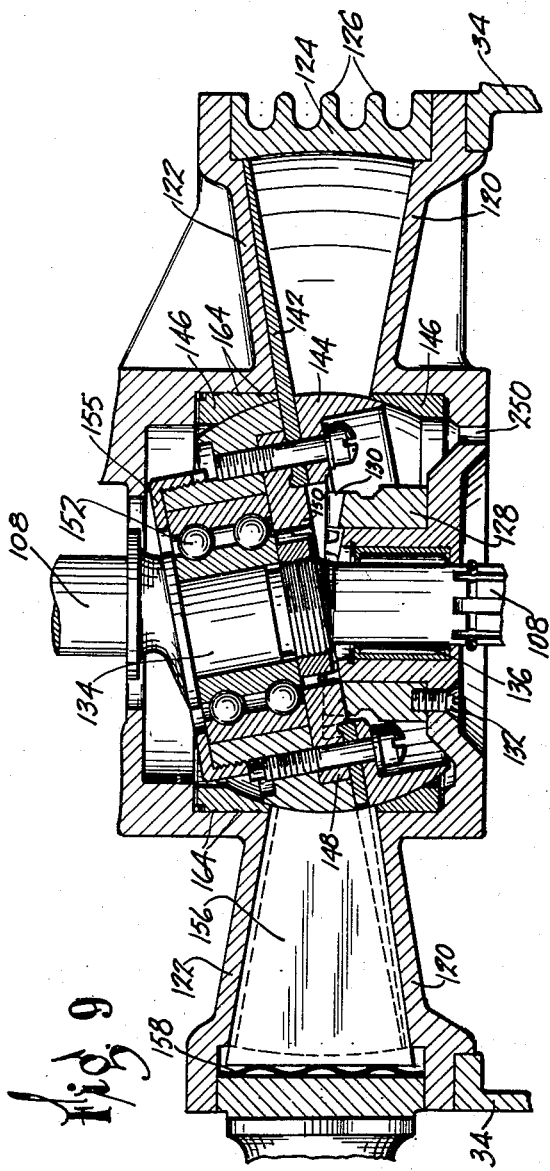
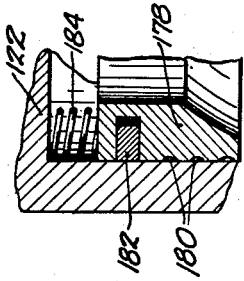
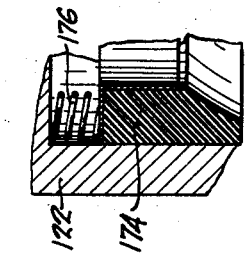
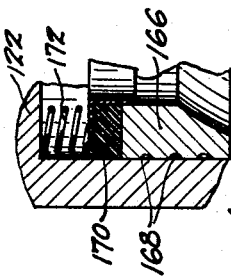
INVENTOR.
ROMUALD KAREY
BY F. Bascom Smith
ATTORNEY.

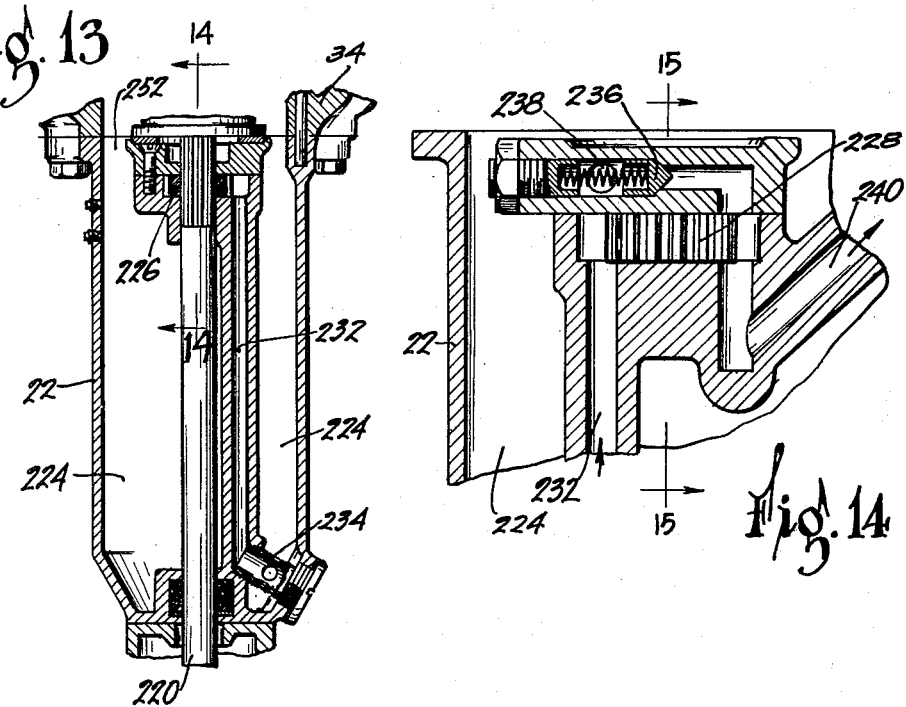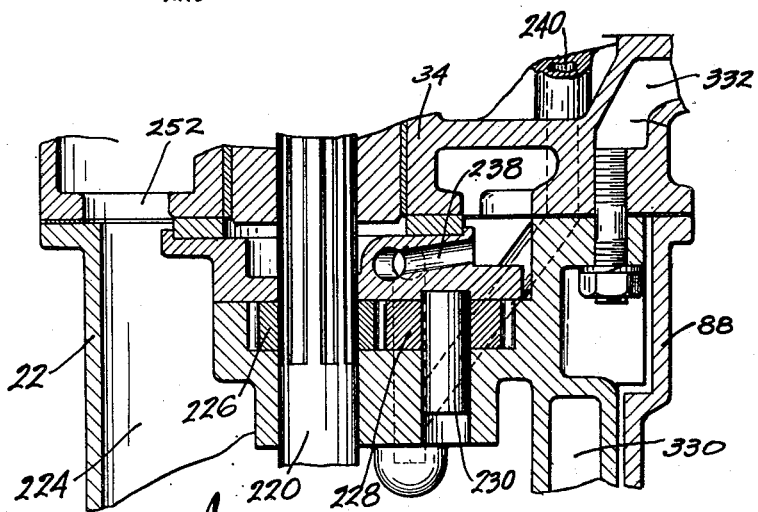

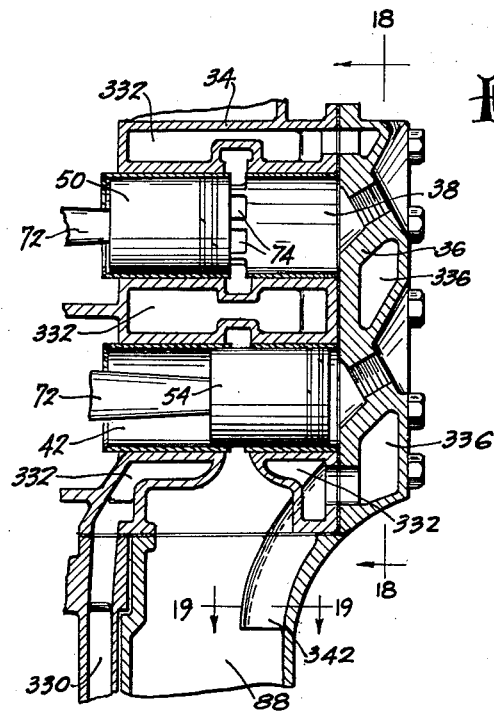
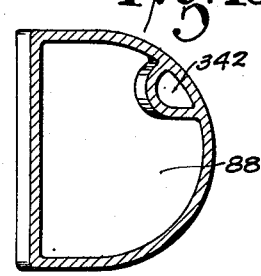
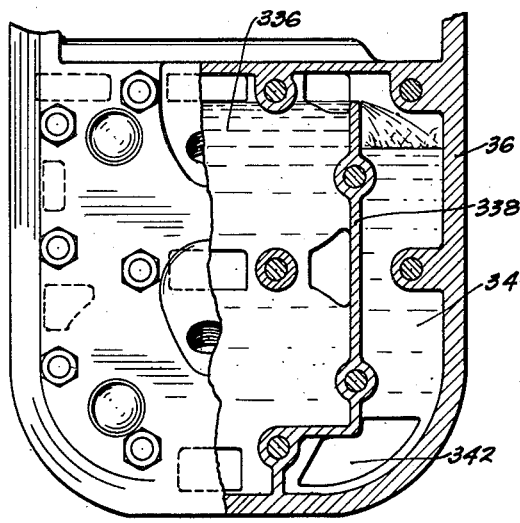

July 7, 1942.  R. KAREY  2,289,124
INTERNAL COMBUSTION ENGINE
Filed April 11, 1939   13 Sheets-Sheet 11
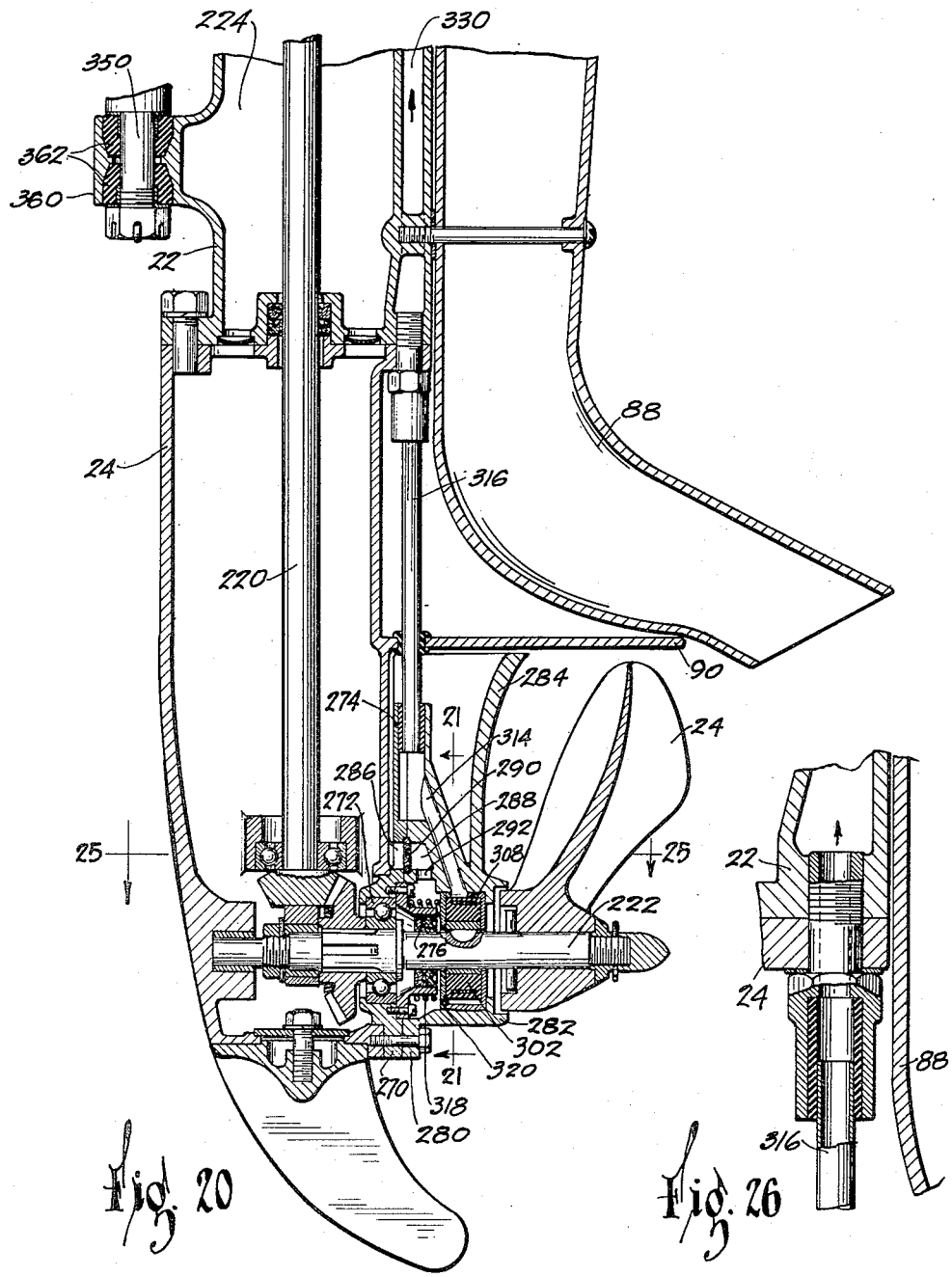
INVENTOR.
ROMUALD KAREY
BY F. Bascom Smith
ATTORNEY.

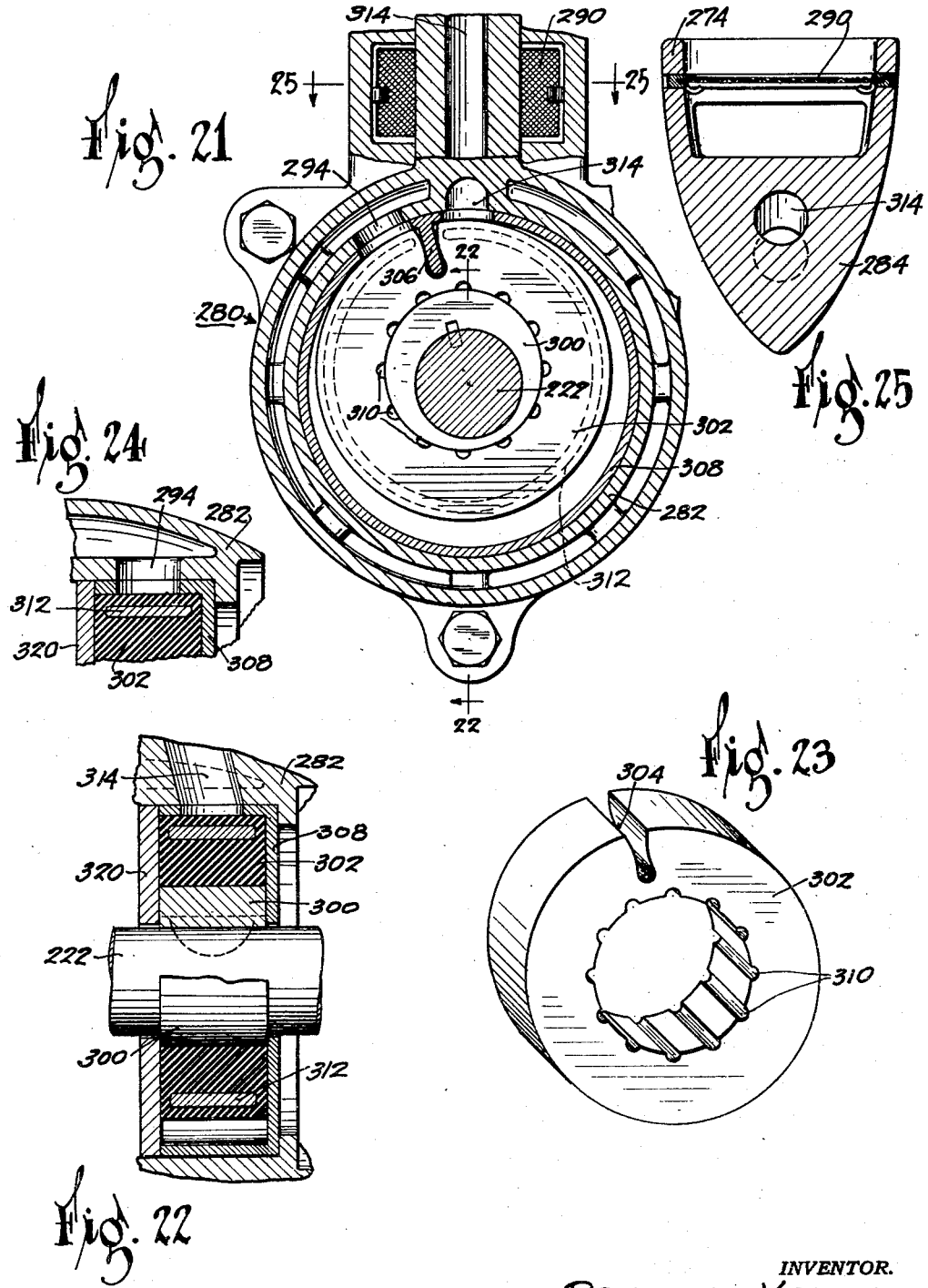

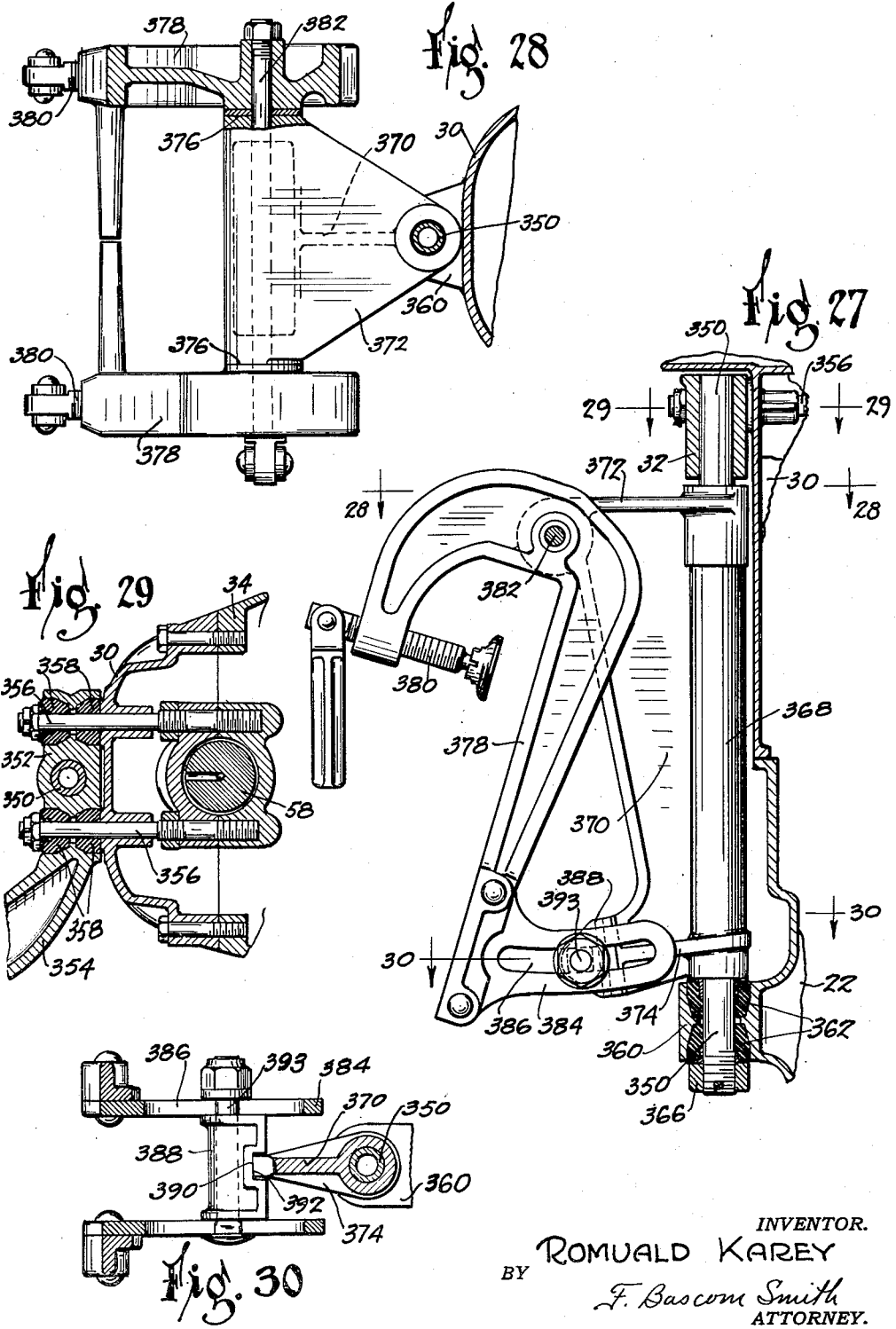

Patented July 7, 1942

2,289,124

UNITED STATES PATENT OFFICE 2,289,124

INTERNAL COMBUSTION ENGINE

Romuald Karey, Hollis, N. Y., assignor to Bendix Aviation Corporation, South Bend, Ind., a corporation of Delaware Application April 11, 1939, Serial No. 267,218

15 Claims. (Cl. 123—53)

This invention relates to internal combustion engines, and more particularly to novel internal combustion engines embodying a supercharged uniflow scavenging engine proportioned to develop maximum power per unit weight.

An object of the invention is to increase the efficiency of the power plant of an outboard motor by increasing the specific power output per unit of piston displacement, and to reduce the specific weight of the engine per horsepower output.

A further object of the invention is to provide a uniflow scavenging engine having a novel bypass interconnecting the parallel cylinders in such a manner that the bypass is partially obstructed by the pistons when they approach the top dead-center position.

Another object is to provide a novel supercharger and drive mechanism therefor to supply the engine with a combustible mixture under pressure.

Yet other objects are to reduce fuel consumption of present relatively inefficient two-cycle outboard engines; to lower operating costs of marine craft by improving efficiency resulting in greater power output with less weight and lower rate of fuel consumption.

A further object is to provide an improved oil circulating and cooling system for the engine and supercharger, thereby increasing the useful life of marine engines.

Another object is to increase boat speed with an engine having relatively small piston displacement of higher power output and lower weight than engines of this type have possessed heretofore.

Other objects and desirable features of this invention relate to the provision of an improved single lever control mechanism to actuate the throttle and spark control mechanisms of the engine; an improved priming control mechanism; a novel swash-plate supercharger and drive, and an improved sealing mechanism therefor.

Other objects and advantages of this invention will be apparent from the following detailed description, considered in connection with the accompanying drawings, submitted for purposes of illustration only and not intended to define the scope of the invention, reference being had for that purpose to the subjoined claims.

In the drawings, wherein similar reference characters refer to similar parts throughout the several views:

Figure 9 is an enlarged sectional view showing the supercharger of Figure 2;

Figure 10 is an enlarged sectional view showing a modified form of sealing mechanism for the swash-plate member of Figure 9;

Figure 11 is a view similar to Figure 10 showing a further modified form of sealing mechanism;

Figure 12 is another view, also similar to Figure 10, showing a still further modified form of sealing mechanism;

Figure 13 is a sectional view of a portion of Figure 1 showing the oil reservoir;

Figure 14 is a sectional view taken substantially on the line 14—14 of Figure 13;

Figure 15 is a sectional view taken substantially on the line 15—15 of Figure 14;

Figure 17 is a sectional view similar to a portion of Figure 2 showing the exhaust and water outlet systems;

Figure 18 is a part sectional view taken substantially on the line 18—18 of Figure 17;

Figure 19 is a sectional view taken substantially on the line 19—19 of Figure 17;

Figure 20 is a sectional view of the lower unit of Figure 1;

Figure 21 is a sectional view taken substantially on the line 21—21 of Figure 20;

Figure 22 is a sectional view taken substantially on the line 22—22 of Figure 21;

Figure 23 is a perspective view of the driving element of the pump shown in Figures 21 and 22;

Figure 24 is a sectional view of the inlet to the water pump shown in Figure 21;

Figure 25 is a sectional view taken substantially on the line 25—25 of Figure 20;

Figure 26 is an enlarged sectional view of a portion of Figure 20;

Figure 27 is an enlarged side elevation, partly in section, of the boat attaching bracket shown on Figure 1;

Figure 28 is a view, partly in section, taken substantially on the line 28—28 of Figure 27;

Figure 29 is a sectional view taken substantially on the line 29—29 of Figure 27; and Figure 30 is a part sectional view taken substantially on the line 30—30 of Figure 27.

Figure 1:
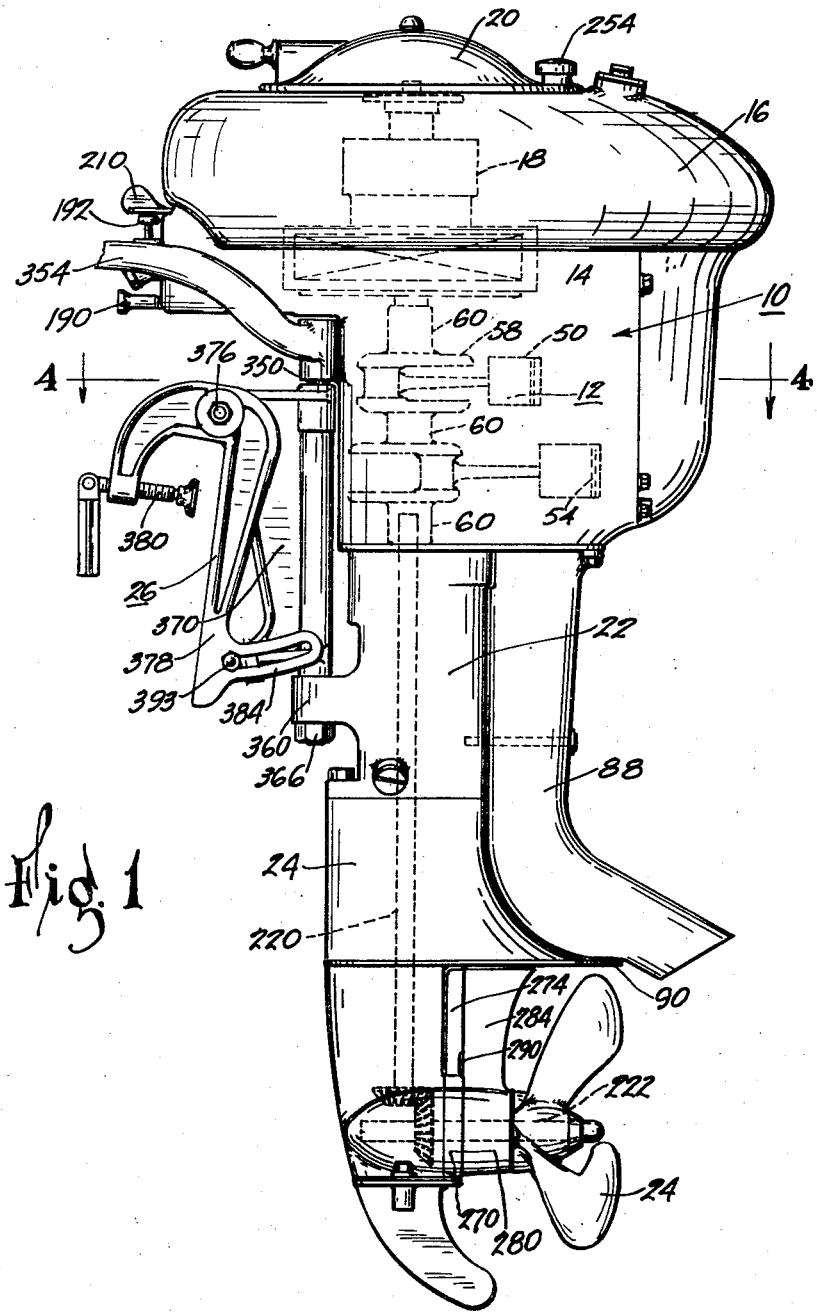
Figure 1 is a side elevation of an outboard motor embodying the present invention.

Referring more particularly to Figure 1, it will be observed that the outboard motor includes a power head 10, having an internal combustion engine 12 which receives a combustible mixture from a supercharger 14. A fuel tank 16 is positioned to surround the supercharger 14, a magneto 18, and other elements of the engine structure. A rope starter rewind mechanism may if desired be housed within a cover plate 20.

Intermediate and lower units 22 and 24 respectively are carried by the power head 10 to transmit power from the engine 12 to a propeller 24 to drive a boat to which the motor is attached by means of a boat engaging bracket 26.

Figure 2:
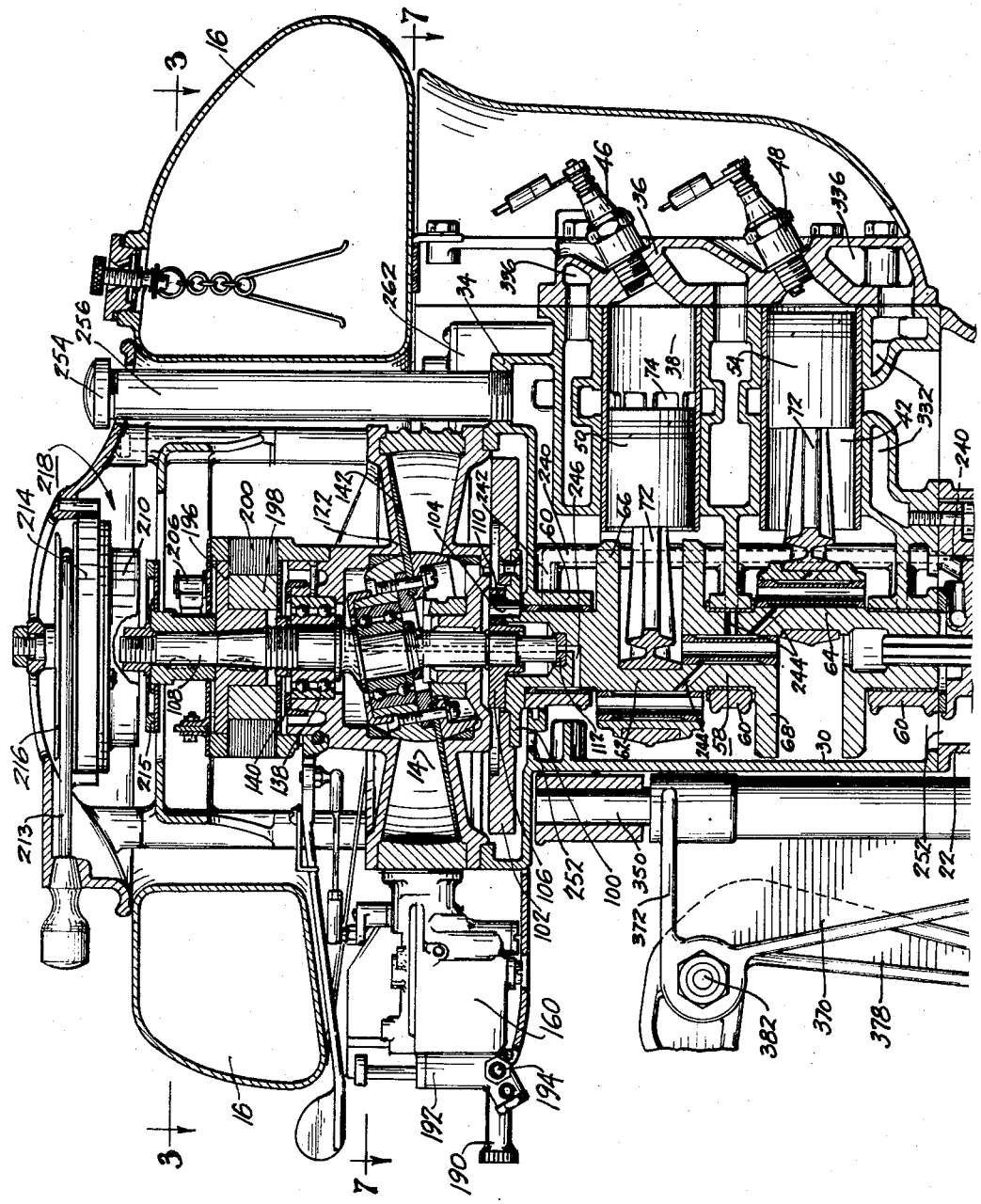
Figure 2 is a sectional view of the power unit of Figure 1.
Figure 4:
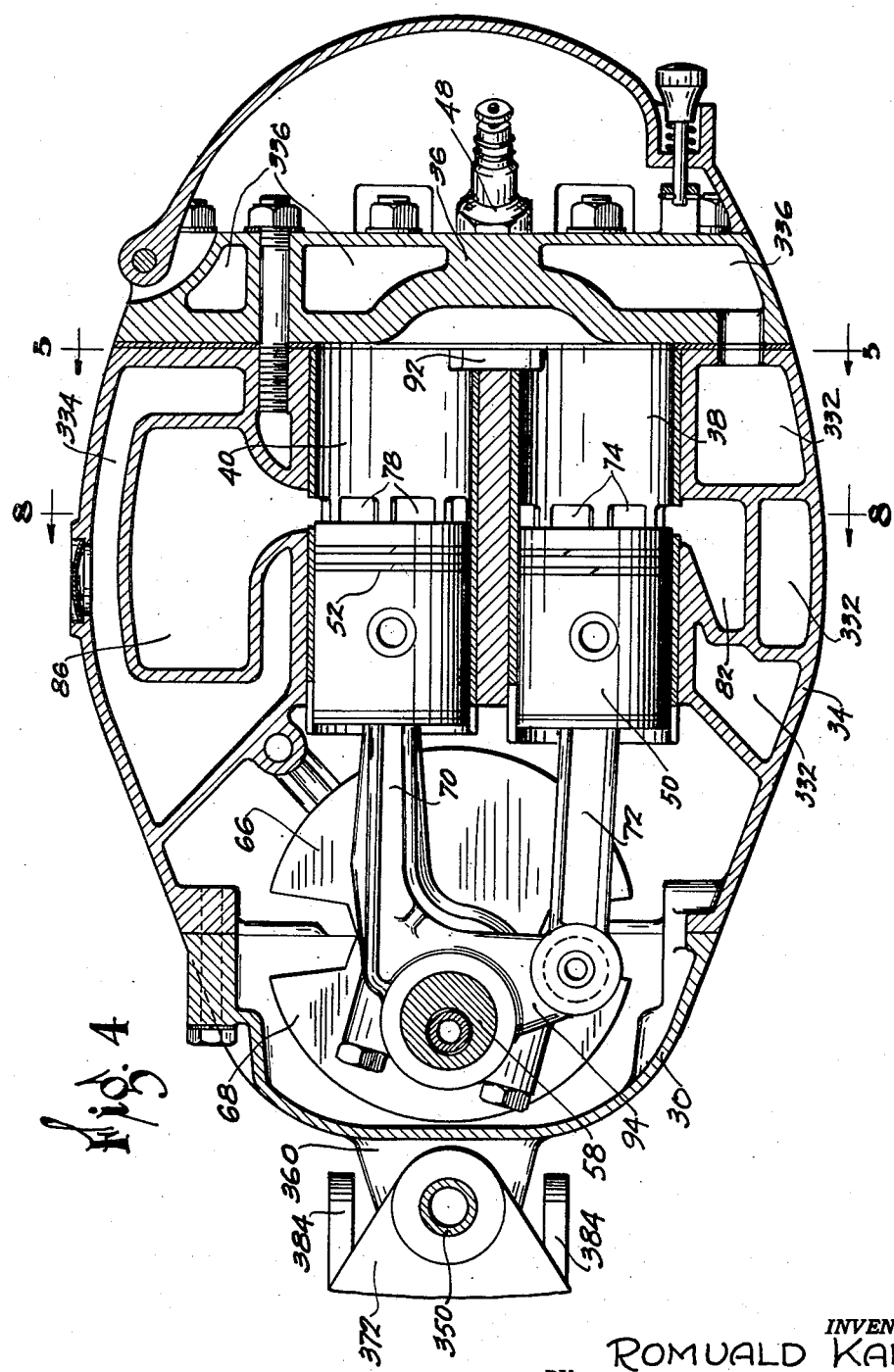
Figure 4 is a view taken substantially on the line 4—4 of Figure 1.

Referring now to Figures 2 and 4, it will be observed that the engine 12 is housed within three casings—a crank shaft casing 30 having a bracket receiving boss 32; an engine cylinder housing 34, and a cylinder head casing 36. These three casing members may be formed of any suitable material, such as cast aluminum or any suitable die-cast alloy. If desired, reinforcing members may be provided in these castings, or they may be formed of cast iron. The engine is preferably of the uniflow scavenging type wherein parallel interconnected cylinders 38 and 40 are provided. Another similar pair of parallel interconnected cylinders 42 and 44 are positioned beneath the cylinders 38 and 40. Each pair of vertically spaced cylinders is provided with a spark plug 46 and 48. The cylinders 38, 40, 42 and 44 may be provided with liners 39, 41, 43 and 45 of suitable material in the form of inserts to provide a suitable surface to receive pistons 50, 52, 54 and 56 slidably mounted therein.

A crankshaft 58 is mounted in the crankshaft casing 30, and is preferably provided with three main bearings 60. The crank shaft 58 is provided with oppositely disposed crank arms 62 and 64, and balancing lobes 66 and 68 to balance the unit. The pistons 52 and 50, and 56 and 54 are connected to the crank arms 62 and 64 respectively of the crankshaft 58 by means of master and articulated rods 70 and 72 respectively. The main bearings 60, and the connecting rod bearings between the master rods 70 and the crank arms 62 and 64 of the crankshaft 58 may be formed with suitable bearing surfaces, such as Babbitt inserts.

Figure 7:
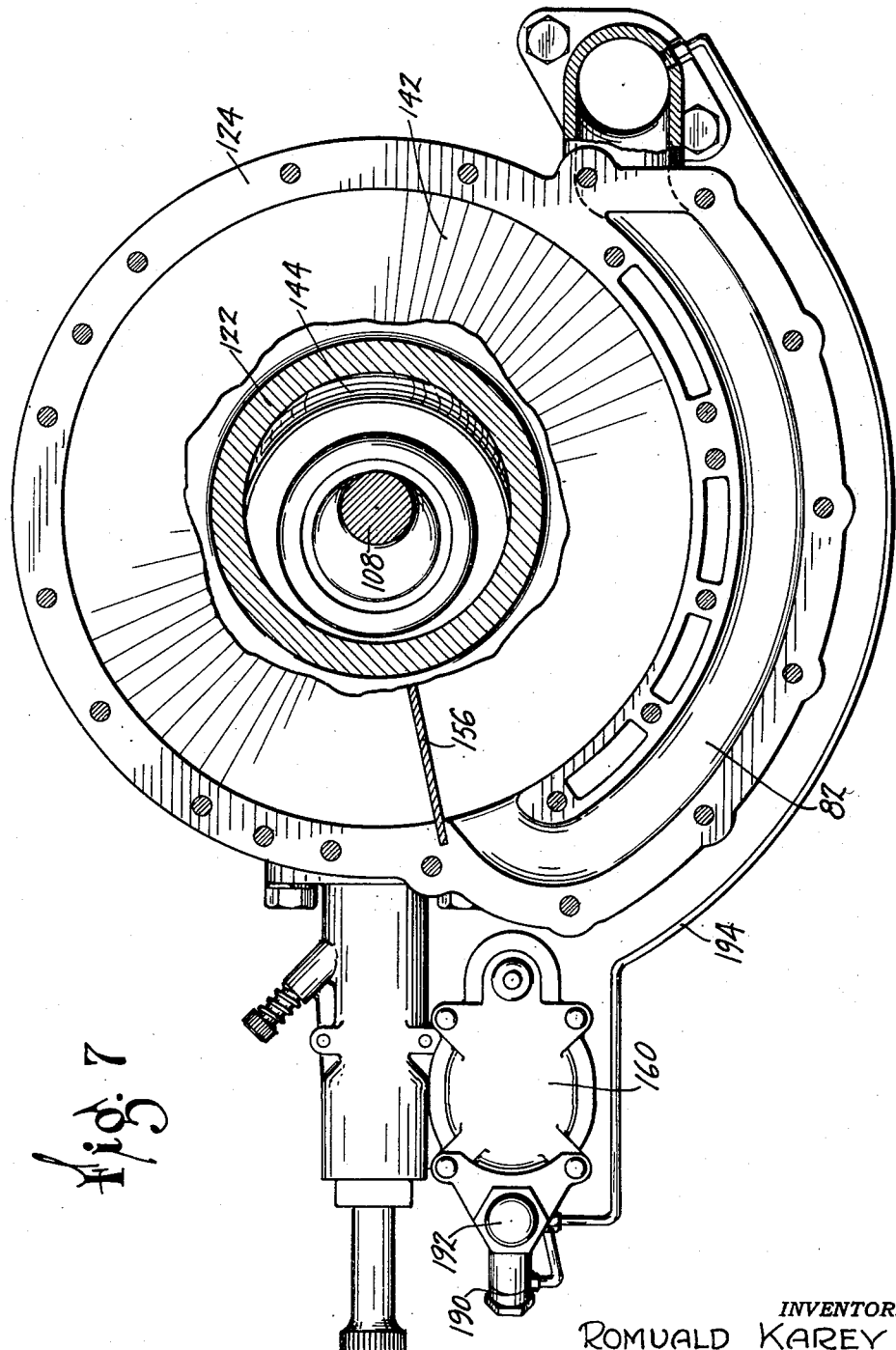
Figure 7 is a view taken substantially on the line 7—7 of Figure 2.

The liners 39 and 43 of the cylinders 38 and 42 may be provided with inlet ports 74 and 76 respectively, and the liners 41 and 45 of the cylinders 40 and 44 may be provided with exhaust ports 78 and 80 respectively. The inlet ports 74 and 76 communicate with a passageway 82 (Figure 7) leading to the supercharger 14. A baffle 84 serves to distribute the charge of combustible mixture from the passageway 82 to the inlet ports 74 or 76 of the intake cylinders 38 and 42. The exhaust ports 78 and 80 of the cylinders 40 and 44 communicate with an expansion chamber 86 which leads to a downwardly directed exhaust passageway 88 which discharges the exhaust gases beneath the surface of the water and to the rear of an anti-cavitation plate 90.

Figure 5:
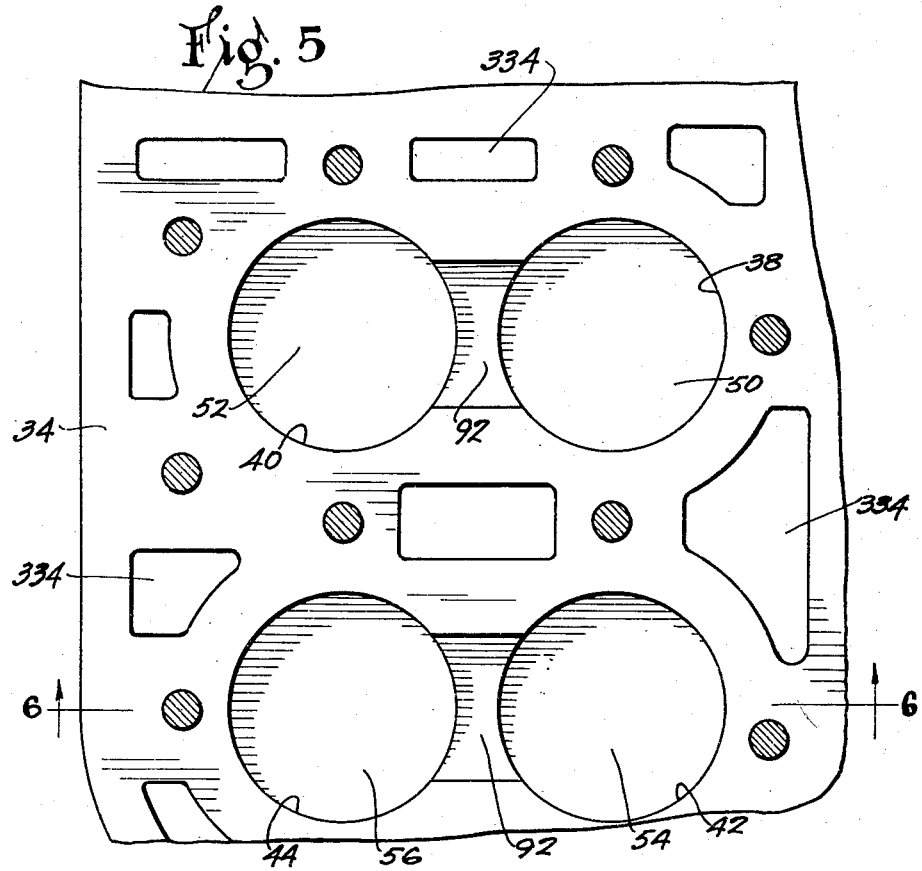
Figure 5 is a view taken substantially on the line 5—5 of Figure 4.
Figure 6:
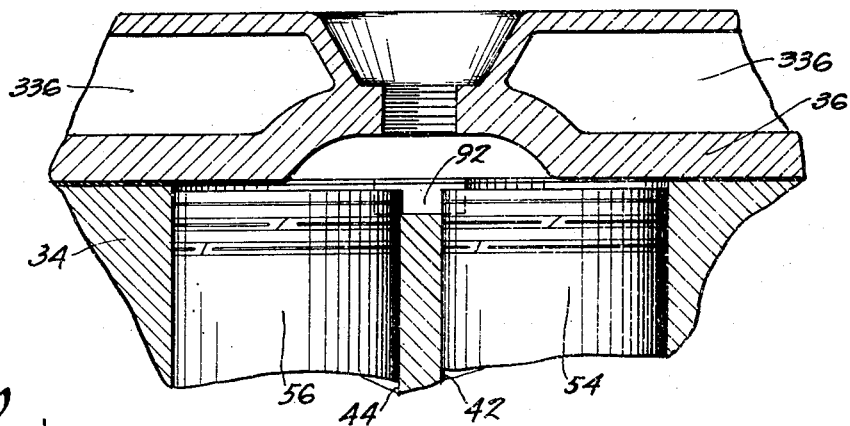
Figure 6 is a view taken substantially on the line 6—6 of Figure 5.

Referring to Figures 4, 5 and 6, it will be observed that the cylinders 38 and 40 are interconnected at their outer ends or at the combustion chamber end. In order to permit sufficient area for the gases to flow freely from the inlet to the exhaust cylinder, without providing undesirable clearance above the tops of the pistons which would reduce the compression ratio by an undesirable amount, the wall between these cylinders may be slotted as at 92. The slot 92 permits rapid flow of gases from the inlet to the exhaust cylinders and when the pistons are at the top dead-center the area of the slot 92 is so small as not to decrease the compression ratio undesirably.

The pistons in the exhaust cylinders 40 and 44 are connected by the master connecting rods 70 to the crank shaft 58. The master connecting rods describe a circular path which moves the exhaust pistons in proportion to the movement of the crank shaft. The pistons in the inlet cylinders 38 and 42 are connected by the articulated rods 72 to arms 94 carried by the master rods 70 connected to the crank shaft 58. The articulated rods 72 therefore describe an elliptical path which moves the inlet pistons at varying speeds in the inlet cylinders as the crank shaft rotates. This varying movement of the pistons which control the inlet and exhaust ports may be varied to give the desired results by increasing or decreasing the length of the arms 94 carried by the master rods 70. It has been found that one desirable arrangement is effected when the linkage is proportioned in such a manner that the exhaust ports open approximately 25° before the inlet ports open, and close before the inlet ports close by approximately 15° or 20°.

In the operation of this engine, as the crankshaft 58 rotates in the clockwise direction as viewed in Figure 4, the piston 52 carried by the master rod 70, uncovers the exhaust ports 78 to exhaust the products of combustion. Since the exhaust ports 78 are located substantially around the full circumference of the cylinder 40, the exhaust gases are rapidly released from the cylinder, whereupon the exhaust cylinder pressure drops abruptly.

The piston 50 uncovers the inlet ports 74 after the exhaust ports 78 are open for approximately 25°. When the inlet ports 74 open the exhaust gas pressure has dropped to practically atmospheric pressure and will therefore offer practically no resistance to the admission of the combustible charge of fuel and air through the inlet ports 74. The combustible charge is formed in the carburetor 160 and is supplied by the supercharger 14 to the cylinders 38 through the passageway 82. In view of the fact that the inlet ports 74 are located substantially around the full circumference of the cylinder 38, the fresh charge will expel the remaining exhaust gases from the cylinders 38 and 40 thereby effecting complete and thorough scavenging of both cylinders. This scavenging process is further improved by the characteristic absence of commingling of the fresh charge with the exhaust gases as it will be seen that as the fresh charge enters around nearly the entire circumference of the cylinders a solid column of gases will be formed which will push the inert exhaust gases ahead on the full length of the U-shaped cylinder volume.

As the cycle continues, the piston 52 will close the exhaust ports 40 while the inlet ports 74 are still open, thus permitting a supercharging effect since the cylinders will be filled with a fresh charge of fuel and air at the mean supercharger pressure, which is of course considerably above atmospheric pressure. The inlet ports 74 are closed approximately 20° after the exhaust ports 78 are closed by the piston 52.

As the cycle continues the charge is compressed in the outer end of the cylinders, bypassing over the top of the cylinder wall and through the slot 92. When the pistons approach the top dead-center position, the charge is ignited by the spark plug which initiates the explosive charge on the pistons which are thereby driven toward the bottom of the cylinders, thereby exerting a force on the crank shaft 58 to rotate it. When the charge has been burned to a desired degree, the piston 52 uncovers the exhaust ports 78 to permit the escape of the products of combustion to the expansion chamber 86 and to the downwardly directed exhaust passageway 88 which discharges the exhaust gases beneath the water level and behind the anti-cavitation plate 90.

It will be noted that the cylinders 42 and 44 are positioned beneath the cylinders 38 and 40 and operate in the same manner as discussed above; however, the cylinders 42 and 44 will be displaced 180° therefrom whereby when one group of pistons are at top dead-center the other group is at bottom dead-center.

The upper end of the crank shaft 58 is provided with a flange 100 which carries a flywheel 102 suitably connected thereto in any desired manner as by rivets. The supercharger 14 which may preferably be of the swash-plate type is positioned above the engine per se.

A plurality of driving pins 104 positioned in the flange 100 receive a flanged member 106 to drive the crank shaft 108 of the supercharger. Resilient bushings 110 are interposed in apertures in the flanged member 106 and surround the driving pins 104 to cushion vibration and absorb any surge action which might develop during the operation of the supercharger. The lower end of the supercharger crank shaft 108 rests upon an apertured resilient member 112 carried by the upper end of the crankshaft 58. The member 112 serves as a seal or gasket, sealing the lubricating oil pressure hole or line against leakage loss.

The body of the supercharger is formed by lower and upper diverging walls 120 and 122 separated at the outer edge by an annular spacer member 124 having heat dissipating flanges 126 formed thereon. The lower wall 120 is fixed to the upper end of the engine cylinder housing 34. A gear member 128 having bevelled gears 130 is fixed to the lower wall 120 of the supercharger by any desired means such as the screws 132.

The crank shaft 108 of the supercharger is provided with an offset crank 134 and is journalled at the lower end in needle bearings 136 and at the upper end in ball bearings 138 (Figure 2) to prevent vertical movement of the shaft 108. The bearings 138 are secured by means of a cap 140 to the upper wall 122 of the supercharger.

The offset rotatable crank 134 carries a swashplate type supercharger. The plate 142 is mounted in a spherical ball member 144 angularly interposed between the central portions of the lower and upper diverging walls 120 and 122. Sealing means such, for example, as the conical shaped members 146, are interposed between the spherical member 144 and the members 120 and 122.

The plate 142 and the member 144 are fixed to a flat gear member 148 having bevelled gear teeth 150 adapted to mesh with the gear teeth 130 of the gear member 128 to restrain the plate 142 from rotation with the shaft 108. The plate assembly is carried on a bearing 152 interposed between it and the offset crank 134 of the shaft 108. The bearing assembly is held in place by means of a threaded cap member 155.

The plate 142 is slotted radially at one point to receive an upstanding partition member 156 extending between the lower and upper diverging walls 120 and 122 respectively, to divide the chamber between the walls 120 and 122 into inlet and outlet passages positioned adjacent and on opposite sides of the partition member 156. Yielding means such as a spring 158 are employed to urge the partition member 156 into engagement with the spherical member 144.

In the operation of this device a combustible charge of fuel and air is supplied by a carburetor 160 to the intake side of the supercharger under the influence of the suction created therein. As the crank shaft 108 of the supercharger 14 rotates, the offset crank 134 imparts an oscillatory or rolling movement to the plate 142 which moves between the walls 120 and 122, and the gears 130 and 150 hold the plate from rotation. A combustible charge of fuel and air is therefore drawn into the supercharger from the carburetor, and is compressed by the plate 142 and discharged through the passageway 82 to the inlet ports 74 and 76 of the intake cylinders 38 and 42.

It will be noted that the supercharger is double acting in that a charge is drawn into it and compressed on opposite sides of the plate 142. The time of maximum pressure discharge from the supercharger may be timed with reference to the opening of the inlet ports 74 and 76 so that a suitable charge under maximum pressure is supplied to the intake cylinders while the inlet valves are open.

It will be observed that the seal 146 is formed with a plurality of annular grooves 164 between it and the vertically disposed wall of the member 122. These grooves serve to trap oil thereby forming a seal to prevent oil in excess quantities from reaching the plate 142.

A modified sealing mechanism is illustrated in Figure 10 wherein an annular member 166 is provided with a plurality of annular grooves 168, and a piece of neoprene or other resilient material 170 is positioned above the member 166, and yielding means 172 are employed to maintain the assembly tight with the inner curved surface of the member 166 urged into engagement with the spherical surface of the member 144 (Figure 9).

Figure 11 illustrates a further modified embodiment of a sealing mechanism wherein a piece of neoprene or other suitable resilient material 174 is positioned to engage the spherical surface of the member 144 and yielding means 176 are employed to maintain the unit in the assembled relation.

The additional modified embodiment illustrated in Figure 12 incorporates an annular member 178 having annular oil retaining grooves 180, and a piston ring member 182. The assembly is yieldingly urged into engagement with the spherical surface of the member 144 (Figure 9) by means of springs 184.

The carburetor 160 may be provided with a manually actuated choke valve 190 to supply an enriched mixture for starting purposes. Means are also provided to supply liquid fuel to the intake cylinders. This means may take the form of a manually actuated push button 192 to induce a flow of liquid fuel through a fuel conduit 194 to the intake cylinders 38 and 42 of the engine.

A magneto 18 may be provided to supply the necessary spark to ignite the compressed charge in the cylinders of the engine. The magneto may be positioned above the supercharger 14, the supercharger shaft 108 being extended upwardly to accommodate it. The magneto includes a rotor member 196 fixed to the shaft 108. A plurality of magnets 198 are carried by the rotor member 196 and are preferably positioned to rotate inside of a stator member 200. Associated with the stator member are a pair of coil and condenser members 202 and 204 respectively, operably connected to breaker points 206 positioned to be actuated by an eccentric 208 fixed to the shaft 108.

Figure 3:
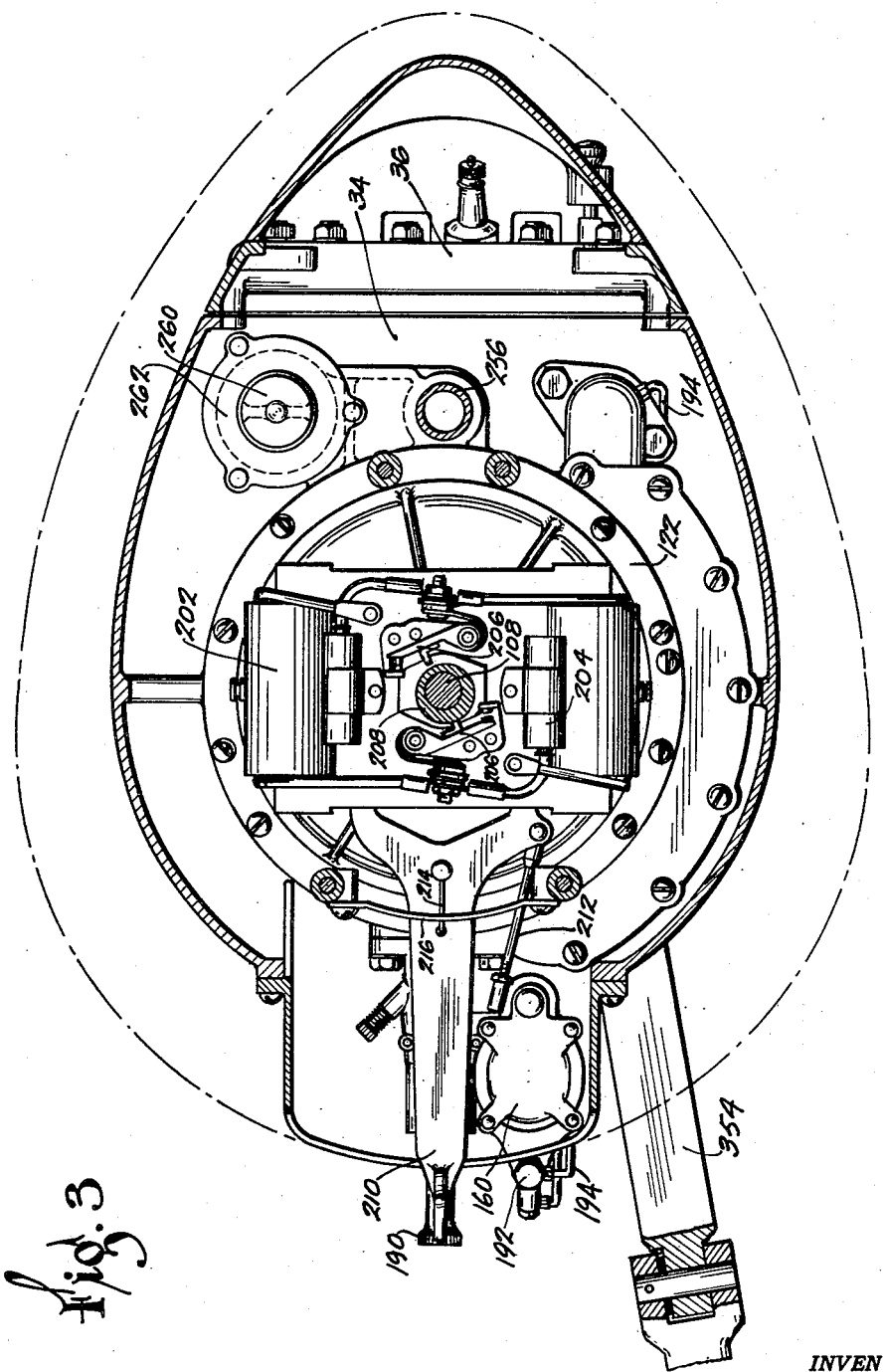
Figure 3 is a view taken substantially on the line 3—3 of Figure 2.

The spark and the throttle of the carburetor may be controlled by a single lever 210 operably connected to a throttle actuating lever 212. When the lever 210 is in the position shown in Figure 3, the throttle of the carburetor is closed and the spark is in approximately the mid position. As the lever 210 is moved to the left (Figure 3) the spark is retarded, and the throttle remains closed. As this lever is moved to the right from the mid position, the spark is advanced and the throttle valve is progressively opened. A spring 214 carried by the member 210 engages an annular rack 215 to hold the member 210 in any position to which it is moved.

The engine may be rotated to start it by means of a rope starting mechanism whereby one end of the rope is attached to a sheave or pulley 216 and the rope 213 is wrapped around the sheave 216 to rotate the engine as the rope is withdrawn. If desired, a rope rewind mechanism and clutch mechanism 218 of a type similar to that disclosed in Patent No. 2,227,392 of Frank V. Kuzmitz, issued December 31, 1940, may be employed for this purpose.

Power from the engine 12 may be transmitted to the propeller 24 by means of a generally vertically disposed shaft 220 fixed to the crank shaft 58 of the engine and extending through the units 22 and 24, to drive a generally horizontally extending shaft 222 to which the propeller 25 is fixed.

The unit 22 through which the shaft 220 extends forms an oil reservoir 224. Means, such for example, as a gear pump, may be provided to supply oil, as a lubricant, to the engine 12 and to the supercharger 14. The upper end of the shaft 220 may be splined to receive the lower end of the crank shaft 58 and a gear 226 of the oil pump. The gear 226 meshes with an idler gear 228 mounted on a pin 230 in the unit 22. An inlet to the suction side of the oil pump is provided in the form of a downwardly directed duct 232 communicating with the bottom of the oil reservoir 224 by way of a screened inlet plug 234. The shaft 220 may be provided with an oil seal at the base of the reservoir where it passes therethrough in order to prevent loss of lubricating oil at this point.

The pressure or discharge side of the pump communicates with a pressure relief valve 236 which may be in the form of an adjustable spring-pressed plunger wherein the spring is compressed to permit oil to return to the reservoir 224, by way of a duct 238 when the pressure developed by the pump exceeds a predetermined value. The discharge side of the pump also communicates with an oil delivery duct 240.

The duct 240 communicates with passageways 242 which transmit oil to lubricate the bearings of the main bearings 60 of the engine. The crank shaft 58 is provided with angularly disposed passageways 244 which transmit oil to lubricate the connecting rod bearings 70 and 72. A passageway 246 formed in the crank shaft 58 communicates through the apertured member 112 with a central aperture 248 in the supercharger shaft 108 which transmits oil to lubricate the supercharger bearings 138, 152 and 136 and also the other moving parts of the supercharger including the member 144.

The excess oil supplied through the aperture 248 in the shaft 108 is drained from the supercharger through orifices 250 and 252 to the engine crankcase, and from these back to the oil reservoir 224 through an opening 252.

The reservoir 224 may be filled with oil by removing a cap 254 from an oil tube 256 and pouring oil therein. The tube 256 communicates with the crankcase of the engine which in turn communicates with the reservoir 224 through the opening 252. A pair of spaced plugs may be provided in the upper portion of the reservoir 224 to enable the operator to ascertain the level of the oil in the reservoir by removing the plugs.

A crankcase pressure relief valve 260 may be provided to allow excess pressure within the crankcase to be relieved. A riser 262 supports the pressure responsive valve 260 and is provided with a filter 264 to prevent the escape of oil from the crankcase.

The engine cylinders and expansion chamber may be cooled by circulating water through passages adjacent their walls. The water for cooling purposes may preferably be supplied by a pump driven by the propeller shaft 222; however, if desired it may be driven by the shaft 220.

The water pumping structure preferably comprises two units surrounding the drive shaft, and each forming a part of the drive shaft housing; however, if desired a single piece may be employed. An annular member 270 surrounding the propeller shaft 222 supports a ball bearing race 272 which receives the propeller shaft 222. The member 270 is provided with an upstanding member 274 spaced a small distance from the rear face of the housing 24 and beneath the anti-cavitation plate. A water seal 276 may be carried by the member 270 to prevent water from entering the gear case of the unit 24.

An annular shaped member 280 having a pump housing member 282 surrounds the propeller shaft 222 and may be clamped to the member 270 and the lower end of the housing 24. The member 280 is provided with an upstanding member 284 which underlies the anti-cavitation plate 90 and is shaped to cooperate with the body of the unit 24 and the member 274 to present a section which will not unnecessarily obstruct the flow of water thereover.

The member 274 is provided with an inlet passage 286 aligned with a similar inlet passage 288 formed in the member 284. A screen 290 is interposed between the passages 286 and 288 to prevent dirt or any foreign particles from entering the pumping structure. The inlet passage 288 in the member 284 communicates by way of a passage 292 with the inlet 294 (Figure 21) of the pump structure.

The pumping structure comprises an eccentric driving member 300 fixed to the propeller shaft 222. The eccentric driving member 300 receives an annular pumping member 302 preferably formed of resilient material such for example as neoprene or other suitable resilient material. A reinforcing collar or insert 312 of steel or other stiff, springy material may be embedded in the resilient material of pumping member 302, to prevent undue distortion or injuries thereto while operating at high speeds. The pumping member 302 is slotted on one side as shown at 304 to receive a restraining vane 306 of an annular insert 308 formed of bronze or other suitable material. The vane 306 co-operates with the pumping member 302 to separate the inlet 294 to the space within the insert 308 from an outlet 314 therefrom. The outlet 314 communicates with a pipe 316 projecting into the members 274 and 284.

The insert 308 is concentric with reference to the propeller shaft 222. The pumping member 302 is formed with a plurality of longitudinally extending slots 310 formed on its inner surface to permit water to flow through it from the outside to lubricate the eccentric driving member 300 to prevent the pumping member 302 locking therewith. A spring 318 yieldingly urges a plate 320 into engagement with the pumping member 302 and with the insert 308 to maintain the unit in the assembled relation.

In the operation of this pump water flows into the space between the member 270 and the housing 24, and also around the member 284 beneath the anti-cavitation plate 90 to the inlet passage 286. The water then flows through the screen 290, through the passage 292 to the inlet passage 294 to the pump.

The propeller shaft 222 rotates the eccentric driving member 300 which induces the pumping member 302 to move in the insert 308, pivoting about the restraining vane 306 to exert suction at the inlet port 294 and to exert pressure on the water to discharge it through the outlet port 314 as the pumping member 302 moves toward the outlet port.

Figure 8:
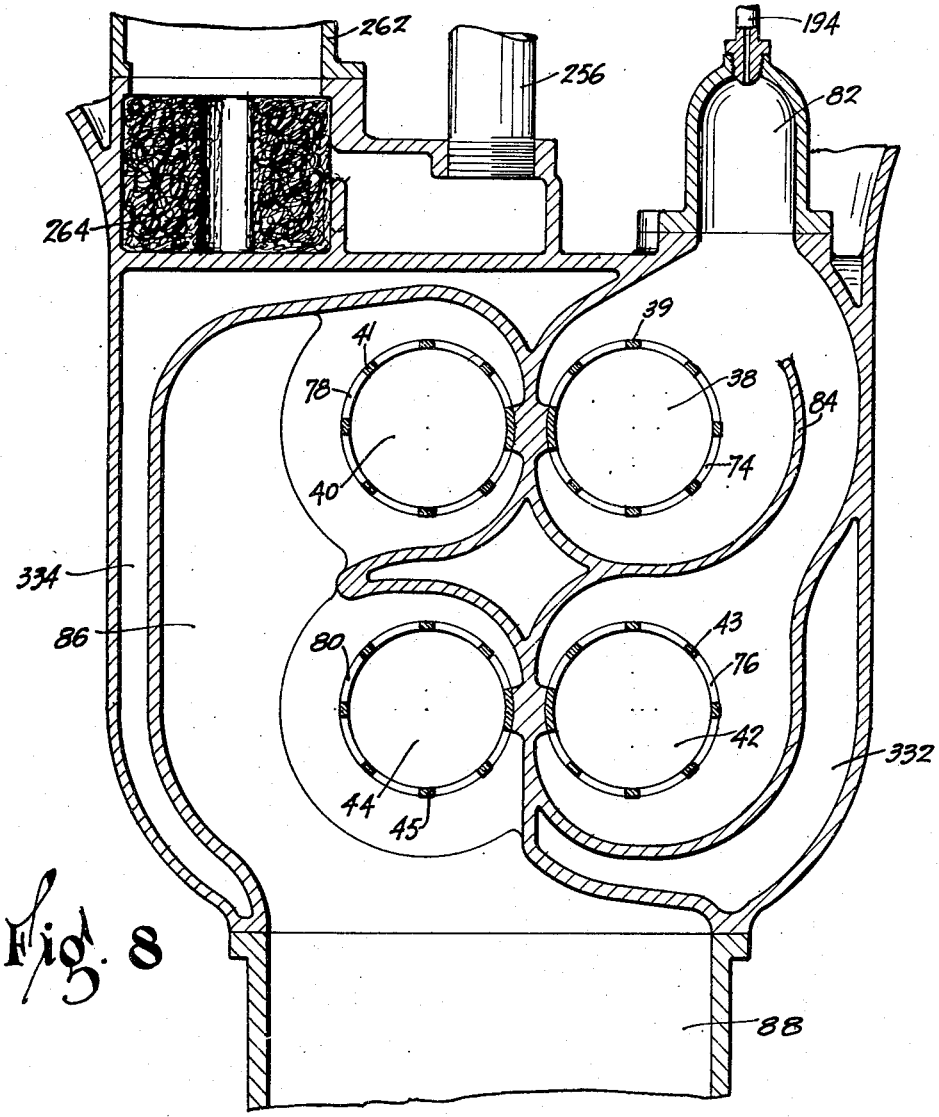
Figure 8 is a view taken substantially on the line 8—8 of Figure 4.
Figure 16:
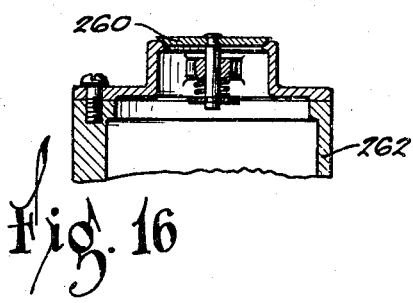
Figure 16 is a fragmentary view in section of the crankcase pressure relief valve.

The water supplied by the pump to the pipe 316 is directed upwardly through a passageway 330 in the housing 22 to the water passages 332 in the engine cylinder housing member 34. Referring to Figure 8, it will be observed that the water also fills a chamber 334 adjacent the expansion chamber 86 which receives the exhaust gases from the exhaust cylinders 40 and 44 of the engine. The water also fills chambers 336 in the cylinder head section 36 of the engine. When the water reaches a predetermined level in the chambers 332, 334 and 336, it overflows an upstanding wall 338 positioned in the cylinder head, parallel to the axis of the cylinders. The water then flows through a downwardly directed passageway 340 in the head to an outlet passage 342 formed in the exhaust passage 88, and is discharged with the exhaust gases.

The steering of the boat is effected by turning the entire motor assembly about a generally vertically extending shaft 350 positioned ahead of and substantially parallel to the shaft 220. The upper end of the shaft 350 is journalled in a member 352 which carries a tiller or steering member 354. The member 352 may be attached to the crank shaft casing 30 of the motor assembly by means of bolts 356. Oppositely disposed resilient members 358 may be interposed between the bolts 356 and the member 352 to absorb vibration developed by the engine to prevent it from being transmitted to the tiller 354 and the boat.

The lower end of the shaft 350 may be received in an apertured boss 360 carried by the intermediate unit 22. A pair of oppositely disposed conical resilient members 362 may be interposed between the lower end of the shaft 350 and the boss 360 to absorb vibration and to prevent it from being transmitted to the boat and the tiller 354. The resistance to the steering operation may be varied by adjusting the nut 366 carried at the lower end of the shaft 350.

The intermediate section of the shaft 350 is provided with a tubular member 368 fixed thereto in any desired manner as by casting it on the shaft 350. The member 368 is provided with a generally vertically extending reinforcing web 370 and upper and lower generally horizontally extending reinforcing webs 372 and 374 respectively.

The upper reinforcing web 372 is provided with flattened surfaces 376 to receive bracket members 378 which engage the transom of a boat, and are provided with adjusting screws 380 to securely fasten the motor to the boat. The brackets 378 are attached to the reinforcing web 372 of the member 368 by means of a bolt 382.

The lower ends of the bracket members 378 are provided with projecting arms 384 having centrally disposed slots 386 therein. A spacer block member 388 having a flattened surface 390 is positioned between the arms 384 and may be adjustably fixed at any point along the slots 386 by means of a bolt 393.

The lower reinforcing web 374 of the web 370 is formed with a flattened surface 392 adapted to engage the surface 390 of the block member 388 to transmit force from the motor to the boat. The block 388 may be moved to varying positions in the slot 386 to vary the angular relation between the bracket members 378 and the shaft 350 to accommodate the motor to use with boats having transoms set at varying angles.

While the invention has been described with particular reference to one desirable embodiment, it is not intended to limit the invention to the features illustrated and described, as many changes can be made therein, without departing from the spirit of the invention as defined by the following claims.

I claim:

1. In apparatus of the class described a two cycle uniflow scavenging engine having a crank shaft, parallel adjacent interconnected intake and exhaust cylinders having inlet and exhaust ports, pistons controlling said ports, a main connecting rod between the crank shaft and the piston in the exhaust cylinder, an articulated rod carried by the main connecting rod interconnecting the crank shaft with the piston in the intake cylinder in such a manner that the exhaust ports open before the inlet ports open and close before the inlet valve closes, the upper portion of the wall between the intake and exhaust cylinders being cut away adjacent the combustion chamber to increase the bypass area between the cylinders without materially reducing the compression ratio.

2. In apparatus of the class described, a uniflow scavenging engine, a supercharger therefor, and pumping means independent of said supercharger for introducing a fuel charge to said engine at a point intermediate the engine and supercharger.

3. The combination with a two cycle engine of a supercharger for said engine having an inlet port, a carburetor in communication with said port, a fuel pump, and means for placing said pump in communication with said engine at a point intermediate the supercharger and engine.

4. In apparatus of the class described, an engine having cylinders with inlet ports, a supercharger for the engine, means for drivably connecting the supercharger and engine, a carburetor for supplying a combustible mixture of fuel and air to the supercharger, and priming means for the engine including means for injecting a fuel charge into said engine at a point intermediate the supercharger and engine and adjacent said ports.

5. In apparatus of the class described a two-cycle engine, a carburetor for the engine, a supercharger placed between the carburetor and the combustion chamber of the engine, and a manually operable fuel injecting device for feeding fuel directly to the combustion chamber of the engine.

6. In a two cycle uniflow scavenging engine, an intake and exhaust cylinder, a parallel intake and exhaust cylinder interconnected thereto, a rotatable driving shaft having an angularly disposed crank, a supercharger swash plate operatively associated with said crank, a casing for said plate in communication with said engine, gear means associated with the casing, cooperating gear means associated with the plate to prevent the latter from rotating in response to shaft rotation, and a pumping member operatively connected to said engine, the periphery of said member constituting the effective pumping surface thereof for pumping a cooling fluid to said engine.

7. In a two-cycle uniflow scavenging engine having a crankshaft, two pairs of parallel adjacent interconnected intake and exhaust cylinders having inlet and exhaust ports, said cylinders being disposed on the same side of the crankshaft, pistons controlling said ports, main connecting rods between the crankshaft and the piston in each of the exhaust cylinders, and articulated rods carried by the main connecting rods interconnecting the crankshaft with the piston in each of the intake cylinders in such a manner that the exhaust ports open and close before the inlet ports, the upper portion of the wall between each pair of intake and exhaust cylinders being cut away adjacent the combustion chamber to increase the by-pass area between the cylinders without materially reducing the compression ratio.

8. In combination, a uniflow scavenging engine, a supercharger therefor, means for introducing a fuel charge to said engine at a point intermediate the engine and supercharger, and means for supplying the supercharger with a combustible mixture.

9. The combination with an internal combustion engine, of a supercharger for said engine having an inlet port, means for introducing a combustible mixture into said port, a fuel pump, and means for placing said pump in communication with said engine at a point intermediate the supercharger and engine.

10. In apparatus of the class described, a two-cycle scavenging engine, a supercharger therefor, and a gear pump driven by said engine for supplying lubricating oil to said engine and said supercharger.

11. In apparatus of the class described, a motor, a crankshaft operatively connected to said motor and driven thereby, a pair of coaxial shafts connected to said crankshaft on opposite sides thereof, a supercharger for said motor driven by one of said shafts, and a pump driven by the other of said shafts, said pump being adapted to supply lubricating oil to said motor and said supercharger.

12. In apparatus of the class described, a two-cycle uniflow scavenging motor including a crankshaft, a pair of coaxial driving members connected to said crankshaft on opposite sides of said motor, a supercharger driven by one of said members, and a gear pump driven by the other of said members, said pump being adapted to supply lubricating oil to said motor.

13. In a two-cycle uniflow scavenging engine, an intake and exhaust cylinder, a parallel intake and exhaust cylinder interconnected thereto, a rotatable driving shaft having an angularly disposed crank, a supercharger swash-plate operatively associated with said crank, a casing for said plate in communication with said engine, gear means associated with the casing, cooperating gear means associated with the plate to prevent the latter from rotating in response to shaft rotation, and a pumping member operatively connected to said engine for pumping a cooling fluid to said engine.

14. In a two-cycle uniflow scavenging engine, parallel interconnected intake and exhaust cylinders, a rotatable driving shaft having an angularly disposed crank, a swash-plate supercharger operatively associated with said crank, a casing for said plate in communication with said engine, means for preventing said plate from rotating in response to shaft rotation, and a pumping member driven by said engine for pumping a cooling fluid to said engine.

15. In a two-cycle uniflow scavenging engine, parallel interconnected intake and exhaust cylinders, a rotatable driving shaft having an angularly disposed crank, a swash-plate supercharger operatively connected to said crank, and pumping means driven by said engine, said pumping means being adapted to pump a cooling fluid to said engine.

ROMUALD KAREY.